April 18, 1961 J. L. GETAZ Re. 24,971

METHOD OF CLOSING TOE OF CIRCULAR KNIT HOSE

Original Filed Aug. 6, 1953 2 Sheets-Sheet 1

INVENTOR.
James L. Getaz
BY Curtis, Morris & Safford
Attorneys

METHOD OF CLOSING TOE OF CIRCULAR KNIT HOSE

Original Filed Aug. 6, 1953 2 Sheets-Sheet 2

INVENTOR.
James L. Getaz
BY Curtis, Morris & Safford
Attorneys

United States Patent Office

Re. 24,971
Reissued Apr. 18, 1961

24,971

METHOD OF CLOSING TOE OF CIRCULAR KNIT HOSE

James L. Getaz, New York, N.Y., assignor of seventy-five percent to United States Trust Co. of New York, and twenty-five percent to Adams-Millis Corporation, High Point, N.C., a corporation of North Carolina Original No. 2,787,899, dated Apr. 9, 1957, Ser. No. 372,750, Aug. 6, 1953. Application for reissue Oct. 14, 1959, Ser. No. 30,697

16 Claims. (Cl. 66—172)

Matter enclosed in heavy brackets [ ] appears in the original patent but forms no part of this reissue specification; matter printed in italics indicates the additions made by reissue.

This invention is related to the manufacture of hosiery and particularly to a method of closing the toe of circular knit hose and the construction of the fabric which is produced by this method.

The greater portion of circular knit hose are made by beginning to knit at the top of the hose and the last portion which is knitted is the toe. The toe is knitted by reciprocating movements of the cylinder of the knitting machine, and during these movements, needles are thrown out of action and into action again and the portion of the hose which is known as the toe pocket is formed. After the completion of the toe pocket additional courses are knitted on all the needles with the cylinder rotating in one direction. The first of these courses is begun when the needles which are on the instep side of the cylinder are put into action and is commonly called the looper course. After the looper course some additional courses are knitted which form the looper heading.

The toe is closed by putting each loop of the looper course on the points of a looper dial. One loop in a wale on the instep side of the hose and the loop in the opposite wale on the toe-pocket side are placed together on one point of the looper dial and when the looping seam is sewed, the sewing needle passes through a pair of these loops as it makes each stitch of the looper seam. As the loops of the looper course are being put on the points of the looper dial, the looper heading is used by the operator to hold the fabric, and before the looper seam is sewed the looper heading is trimmed off and discarded.

The knitted fabric is flexible and elastic and it requires a great deal of skill to place the loops of the looper course on the points of the looper dial in their proper order.

It is a purpose of this invention to construct a loopless toe for circular knit hosiery, by which a satisfactory seam is produced in closing the toe without the labor of putting the loops of the looper course on the points of the looper dial. Another purpose of this invention is to save yarn which is used in the looper heading.

In this patent application reference is made to closing the toe by sewing the end of the toe-pocket portion of the hose to the end of the instep portion, but the methods disclosed by this invention are applicable for closing the toe of other types of hosiery in which a different construction of the toe is used.

In the specification which follows, a method is shown for bringing the end loops of each wale in the instep portion in proper relation to the end loops of each wale of the toe pocket portion, for sewing, without placing t..ese loops on the points of a looping machine. In order to bring the loops of the two sides of the looper course in alignment so that they may be properly sewed together, it is necessary to provide a distinguishing characteristic to the construction of the looper course so that its identity is easily determined, and the two portions of this course may be brought together with a minimum of effort or attention.

In ordinary looping the looper course is often distinguished by drawing the loops longer than in the adjacent courses so that this course may be more easily seen as the operator places the loops on the points of the looping machine. In this invention it has been found more practicable to distinguish the looper course by making it thicker than the adjacent courses, or the looper course may be identified by increasing the thickness of a course which is adjacent to it.

This additional thickness forms a cord which projects from the face of the fabric. Such a projection has the advantage not only of being easily observed but it provides a mechanical means for placing the looper course in proper position for sewing.

This cord may be constructed by different methods, the method which is preferred is to lay in an additional yarn in front of selected needles, below the latches thereof, and behind intervening needles as the course is being knit which is to contain the cord. This method is similar to that shown in my Patent No. 2,230,403 for making a selvedge at the beginning of the hose.

The laying in of such a yarn in the looper course or in an adjacent course will not produce a selvedge, but by this method a heavy cord may be made without knitting a special yarn in the hooks of the needles.

Figures 1, 2, 3:
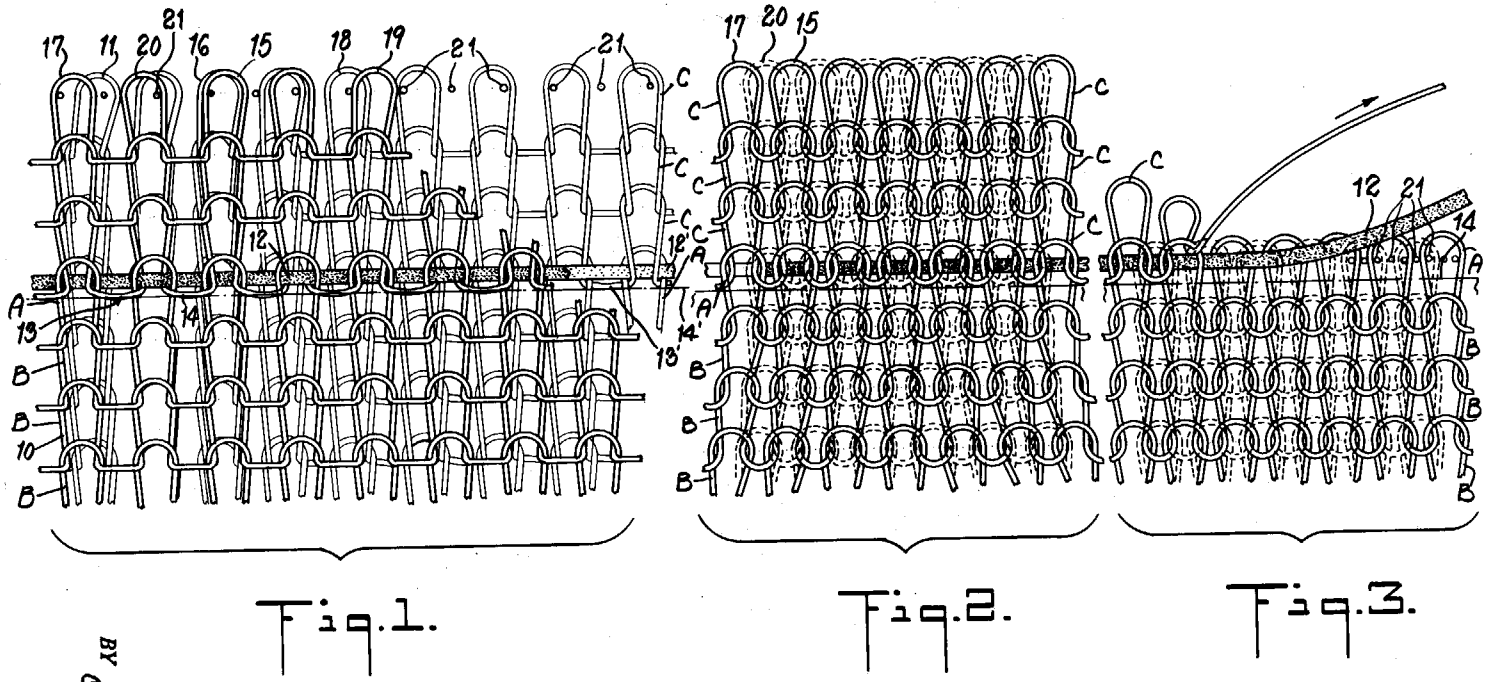
Fig. 1 shows the two portions of fabric, which are to be sewed, brought opposite each other.
Fig. 2 is a view of the reverse side of one of the portions after it has been contracted.
Fig. 3 shows the same fabric as in Fig. 2 with the cord and waste courses being removed.

In Figure 1 the loops 10 which are shown in heavy lines form the reverse side of the fabric of one of the portions to be sewed, and the loops 11 which are shown in light lines form the face of the fabric of the opposite portion. The face sides of these two portions are brought together, the portion shown by the light lines being behind the one shown in heavy lines. In the upper right hand corner of this figure the heavy lines which show the reverse side of the fabric in front are omitted showing the face of the fabric in the rear more clearly.

In Figures 1, 2 and 3, the looper course is distinguished by the letter A. Courses B form portions of the fabric which are to be sewed together. Courses C are waste courses which are added to hold the cord 12 in place and these courses are removed, as shown in Figure 3, before the two portions are sewed together.

The cord 12 in the reverse side of the fabric is held by sinker wales 13, and the cord 12' on the face side of the fabric which is shown by the light lines of Figure 1 is held by the sinker wales 13'. The cords 12 and 12' are two portions of the same cord which are in the two portions of the fabric.

In bringing the end loops of the looper course in the two portions of the fabric together so that they may be sewed, it is necessary that these loops be aligned with each other both wale-wise and course-wise. The alignment wale-wise is accomplished by bringing the cords 12 and 12' to rest on the edges of the guides 14 and 14' as shown in Figures 1, 2 and 3 and the left portion of Figure 4. An end view of the position of these portions of the cord 12—12' on the guides 14 and 14' is shown in Figure 5.

The space between the edges of the guides 14 and 14' is just wide enough to receive the two thicknesses of fabric which are to be sewed, and the cords 12 and 12' being of greater thickness than the yarn which is used in the fabric, form projections in the sides of the fabric which are too thick to pass through the opening between the edges of the guides 14 and 14'. As these cords 12 and 12' are brought to rest on the edges of the guides 14 and 14' they bring the two portions of the looper course which are in the instep portion and the toe pocket portion of the fabric opposite to each other along the full width of the fabric.

Figure 4:
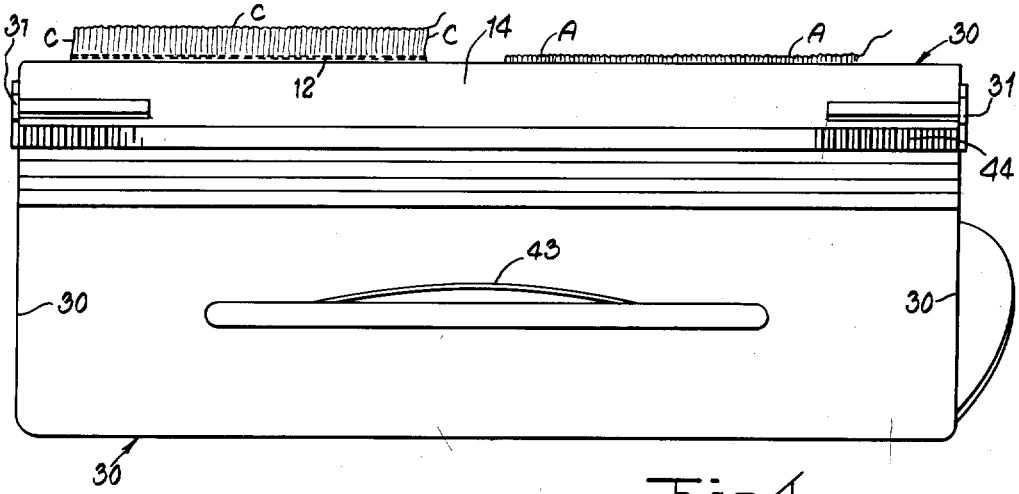
Fig. 4 is a side view of the carrier which holds the goods to be sewed.
Figure 5:
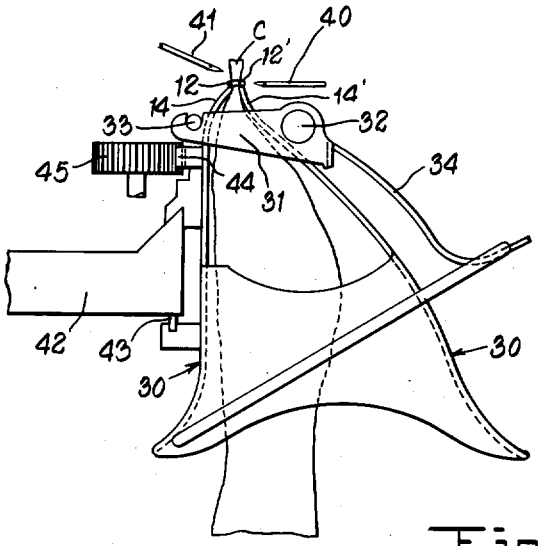
Fig. 5 is an end view of this carrier.

While this arrangement as shown in Figures 1, 4 and 5 is effective in bringing the loops of the two portions of the looper course in alignment wale-wise, it does not provide any means of aligning these loops course-wise. On account of the irregularity of the position of the loops in knitted fabrics, the relative position of the loops of corresponding wales in the two portions of fabric may vary as shown in Figure 1. Loops 15 and 16 are in corresponding wales of the two portions of fabric and are practically in course-wise alignment, but loops 17 and 11 do not align so well, though they be in corresponding wales, and the same is true of loops 18 and 19. The same irregularity applies to the looper course, the top course being described as it is more easily seen. It is apparent from these variations in the relative position of the loops of the corresponding wales of the two portions that one or more stitches might pass through a loop of one wale and miss the loop of the corresponding wale of the other portion. This is shown by the paths 21 of the sewing needle 40 to Figure 1. Also in making some of the sewing stitches the path of the needle 40 might pass between the loops and not engage a loop in either portion of fabric.

To bring these loops in a desired position course-wise, the width of the fabric is contracted to half or less than half its normal width as shown in Figure 2. In Figure 1, loops 15 and 17 are shown in alternate wales with loop 20 in the intervening wale, while in Figure 2 loops 15 and 17 are brought more closely together so that they are adjacent to each other and loop 20 is shown in dotted lines behind them. In Figure 2, on account of the contracted position of the wales, it is not convenient to show the face of the opposite portion of the fabric, and only the reverse side of one portion is shown, the same is true of Figure 3.

This fabric may be contracted manually, but a preferred method of obtaining this contraction is to use for the cord 12—12' an elastic thread, which is made of a rubber core covered with natural or synthetic yarn. This elastic cord is laid to the looper course A or in an adjacent course in front of selected needles and behind intervening needles under heavy tension. When the fabric is removed from the knitting machine, the contraction of the cord 12—12' under tension contracts the loops of course A and the courses adjacent to it, in a manner which is similar to that shown in by Patent No. 2,230,403.

The action of the elastic cord 12—12' in drawing the wales into this compact formation is uniform throughout the width of the fabric, and by bringing alternate loops close together and intervening loops behind them, any variations in the relative positions of the loops course-wise is reduced to a minimum. Also because these loops are in such a close arrangement that they overlap each other, a stitch made by needles 40 and 41 of the sewing machine must pass through a loop of both the instep portion and the toe pocket portion of the fabric as shown in Figure 3 by the location of the paths 21 of the sewing needle 40.

The two portions of the fabric, which consists of courses B, having been contracted as shown in Figure 2, are placed between guides 14 and 14' which are part of a carrier 30. The cords 12 and 12' rest on the top edges of these guides. The guides 14 and 14' are then clamped together by levers 31 at either end of the carrier. These levers turn on an eccentric shaft 32 which is mounted on guide 14', and engage pins 33 which are on guide 14. The two guides 14 and 14' are clamped tightly together as the eccentric shaft 32 is turned manually by the lever 34, as it is brought to the position shown in Figure 5.

After the portions of the fabric have been clamped in position the cord 12—12' and the courses C project above the tops of the guides 14 and 14' as shown in Figure 5 and the left hand portion of Figure 4. Courses C are then unravelled and the cord 12—12' removed as shown in Figure 3 and the loops of course A are ready to be sewed together. These loops project above the top of the guides 14 and 14' as shown in the right hand portion of Figure 4, and they are engaged by the sewing needle 40 which moves back and forth just clearing the top edges of these guides 14 and 14' as shown by its position in Figure 5.

The spacing of the stitches of the seam is accomplished by feeding the carrier 30 past the sewing needle 40 and the looper needle 41. The carrier 30 slides on a track 42 which is attached to the frame of the sewing machine (not shown) and is held to the track 42 by the spring 43. The carrier is driven by a rack 44 which is attached to its side and which engages a gear 45. This gear 45 is driven by the feeding mechanism of the sewing machine and its speed in reference to the strokes of the needles 40 and 41 may be so regulated as to space the stitches as close together as desired.

On account of the two portions of the fabric being sewed together in contracted position, it is desirable that the seam be made with a large number of stitches per inch, so that the seam may have elasticity for free expansion when the fabric is removed from the clamp. Also the large number of stitches per inch permit two or more of these stitches to pass through each loop of the looper course which makes more positive the engagement of each loop by the sewing needle 40.

After the two portion of fabric are sewed together in this manner, the lever 34 is raised releasing levers 31 from pins 33, and unclamping the fabric between guides 14 and 14'. The fabric is then removed from the carrier 30 and the operation of closing the toe is completed.

These two portions of fabric are sewed together in a contracted position, but when the fabric is removed from the carrier it does not remain contracted. If the proper number of stitches per inch are used in sewing the seam, a two-thread over seam chain stitch stretches so that the fabric assumes its normal width as shown in Figure 1.

I claim:

1. A method of closing the toe of circular knit hose having an instep portion and a toe pocket portion in the fabric of said hose, which comprises, constructing a special course of said fabric at the end of said instep portion and the end of said toe pocket portion, said special course having greater thickness than adjacent courses of said fabric, utilizing said greater thickness of said special course to align the end of said instep portion with the end of said toe pocket portion, and sewing together the ends of said portions.

2. A method of closing the toe of circular knit hose having an instep portion and a toe pocket portion in the fabric of said hose, which comprises, constructing a special course in said fabric at the end of said instep portion and the end of said toe pocket portion, said special course having greater thickness than the adjacent courses of said fabric, placing the ends of said portions in an opening between the parallel edges of two adjacent supporting members said opening being wide enough to receive said adjacent courses but not wide enough to receive said special course, bringing said special course in alignment with said edges, and sewing the ends of said portions together.

3. A method of closing the toe of circular knit hose having an instep portion and a toe pocket portion in the fabric of said hose, which comprises, constructing a special course in said fabric at the end of said instep portion and extending around the end of said toe pocket portion, said special course having greater thickness than the adjacent courses of said fabric, placing the ends of said portions in an opening between the parallel edges of two adjacent supporting members said opening being wide enough to receive said adjacent courses but not wide enough to receive said special course, bringing the portion of said special course on said instep portion in alignment with one of said edges, bringing the portion of said special course in said toe pocket portion in contact with said instep portion and in alignment with the other of said edges, removing said special course from the ends of said portions, and sewing the ends of said portions together.

4. A method of closing the toe of circular knit hose having an instep portion and a toe pocket portion in the fabric of said hose, which comprises, knitting a special course in said fabric at the ends of said portions, said special course having greater thickness than the adjacent courses of said fabric, utilizing said greater thickness of said special course to align the end of said instep portion with the end of said toe pocket portion, unravelling said special course, and sewing together the end of said instep portion and the end of said toe pocket portion.

5. A method of closing the toe of circular knit hose having an instep portion and a toe pocket portion in the fabric of said hose, which comprises, constructing a special course of greater thickness than the adjacent courses of said fabric by incorporating an additional thread at the ends of said portions by laying said thread in front of selected needles and behind intervening needles during the knitting of said fabric utilizing said greater thickness of said special course to align the end of said instep portion with the end of said toe pocket portion, and sewing together said ends of said portions.

6. A method of closing the toe of circular knit hose having an instep portion and a toe pocket portion in the fabric of said hose, which comprises, constructing a special course at the ends of said portions having greater thickness than the adjacent courses of said fabric by laying in an additional thread in front of selected needles below the latches thereof and behind intervening needles, during the knitting of said fabric, placing the ends of said portions *in* contact with each other and in an opening between two straight edges, said opening being wide enough to receive said adjacent courses, but not wide enough to receive said special course, bringing the portion of said special course in said instep portion in alignment with one of said edges, bringing the portion of said special course in said toe pocket portion in alignment with the other of said edges, unravelling said special course, and sewing together the ends of said portions.

7. A method of closing the toe of circular knit hose having an instep portion and a toe pocket portion in the fabric of said hose, which comprises, constructing a special course at the ends of said portions having greater thickness than the adjacent courses of said fabric by laying in an elastic thread under tension in front of selected needles below the latches thereof and behind intervening needles, during the knitting of said fabric, contracting the width of said fabric, unravelling said special course, sewing together the ends of said portions.

8. A method of closing the toe of circular knit hose having an instep portion and a toe pocket portion, which comprises, incorporating an elastic thread under tension in the fabric of said hose at the ends of said portions, contracting the width of said fabric by said tension of said thread, clamping together the contracted ends of said portions, feeding said contracted ends past sewing needles, and sewing together said portions with said needles.

9. A method of closing the toe of circular knit hose having an instep portion and a toe pocket portion, which comprises, incorporating an elastic thread under tension in the fabric of said hose at the ends of said portions, contracting the width of said fabric by said tension of said thread, clamping together the contracted ends of said portions, removing said elastic thread, feeding said contracted ends past sewing needles and sewing together said portions with said needles.

10. A method of closing the toe of circular knit hose having an instep portion and a toe pocket portion, which comprises, constructing a special course at the ends of said portions having greater thickness than the adjacent courses of said portions by incorporating an elastic thread under tension in the stitches of said course, contracting the width of said portions by said tension of said thread, placing said contracted portions in an opening between two straight edges, said opening being wide enough to receive said adjacent courses but not wide enough to receive said special course, bringing said special course in alignment with said edges, and sewing together the ends of said portions.

11. A method of closing the toe of circular knit hose having an instep portion and a toe pocket portion, which comprises, constructing a special course extending around the ends of said portions by incorporating an elastic thread under tension in the stitches of said course, contracting the width of said ends of said portions by said tension of said thread, placing the ends of said portions in contact with each other and in an opening between two straight edges, bringing the portion of said special course in said end of said instep portion in alignment with one of said edges, bringing the portion of said special course in said *end* [edge] of said toe pocket portion in alignment with the other of said edges, clamping together the ends of said portions, removing said special course, sewing together the ends of said portions.

12. A method of closing the toe of circular knit hose having a foot portion and a toe portion, which comprises, constructing a special course at the ends of said portions by incorporating an elastic thread under tension in the stitches of said course, contracting the width of said ends of said portions by said tension of said thread, bringing said contracted ends of said portions together, removing said special course, sewing the ends of said portions together.

13. A method of closing the toes of circular knit hose having an instep portion and a toe pocket portion in the fabric of said hose, which comprises, constructing a special course at the ends of said portions, contracting the width of said fabric at the ends of said portions, holding said contracted portions in a clamp, aligning said special course with the edges of said clamp, sewing together the ends of said portions.

14. A method of closing the toe of circular knit hose having an instep portion and a toe pocket portion in the fabric of said hose, which comprises, knitting a special course extending around the ends of said portions, contracting the width of said fabric at the ends of said portions, aligning the portion of said special course on said contracted instep portion with the portion of said special course on said contracted toe pocket portion, unravelling said special course, sewing together the ends of said portions in said contracted condition.

15. A method of closing the toe of circular knit hose, having a looper course extending through the end of the foot portion and the end of the toe portion, in the fabric of said hose, which comprises, aligning the loops of said course wale-wise by bringing the portions of said course in said portions of said fabric opposite each other, aligning the loops of said course course-wise by *systematically* contracting said fabric *to a significant degree,* sewing together said loops in said aligned portions.

*16. A method of closing the toe of circular knit hose, having a looper course extending through the end of the foot portion and the end of the toe portion, in the fabric of said hose, which comprises, aligning the loops of said course wale-wise by bringing the portions of said course in said portions of said fabric opposite each other, aligning the loops of said course course-wise by contracting said fabric, seaming together the loops in such opposed portions with a seam of stitches so closely spaced that at least two of said stitches pass through each of said loops.*

References Cited in the file of this patent or the original patent

UNITED STATES PATENTS 2,515,506 Getaz ---------- July 18, 1950